March 10, 1953     W. L. WEAKLEND     2,631,057
TRACTOR CAB
Filed Nov. 4, 1949
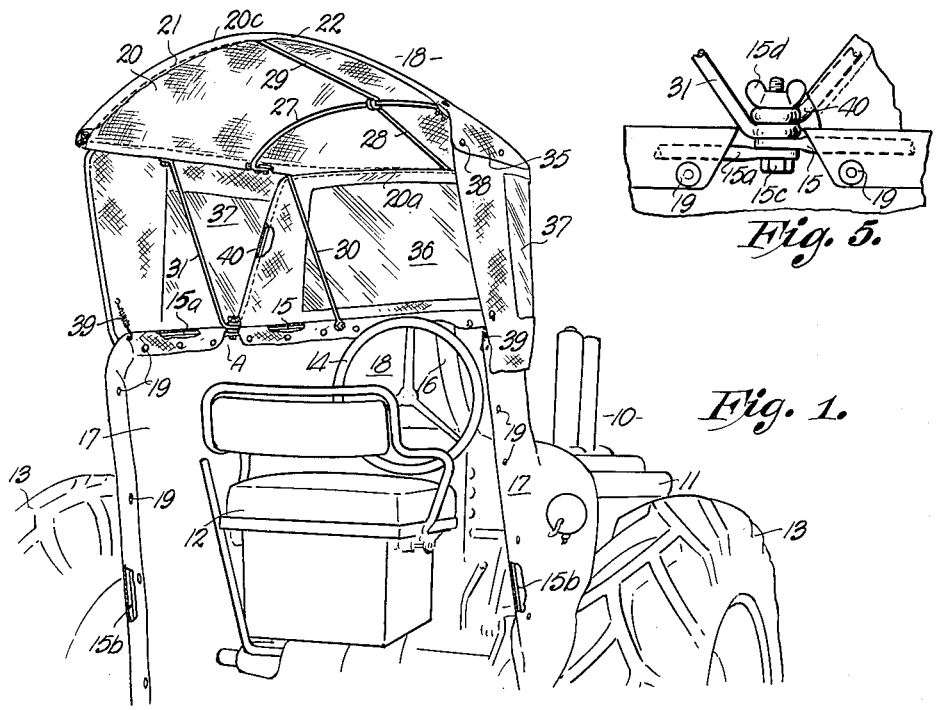
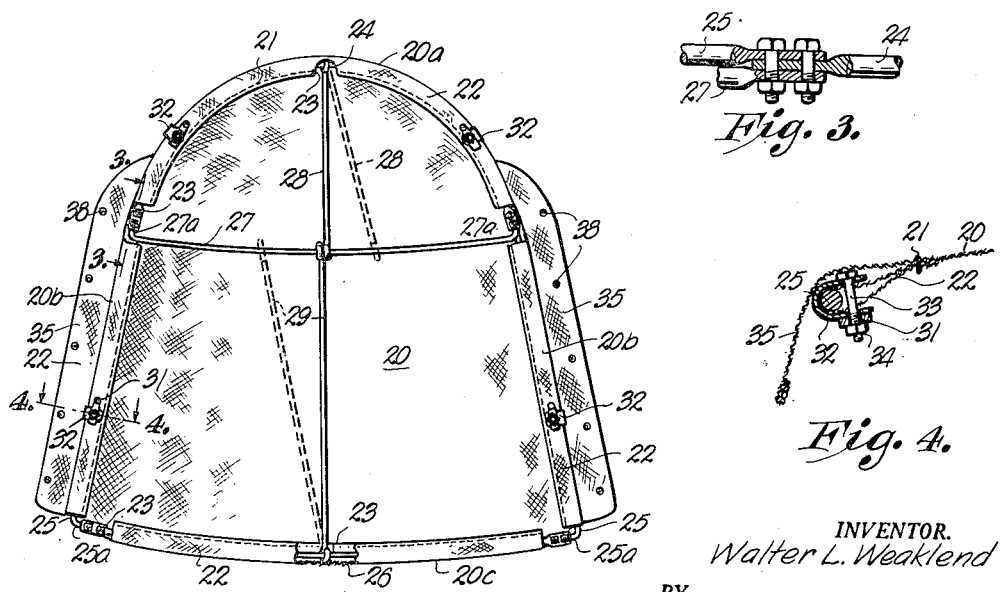
INVENTOR.
Walter L. Weaklend
BY
Thos. E. Scofield
ATTORNEY.

Patented Mar. 10, 1953

2,631,057

UNITED STATES PATENT OFFICE 2,631,057

TRACTOR CAB

Walter L. Weaklend, Platte City, Mo., assignor to Rockledge Manufacturing Company, a corporation of Missouri Application November 4, 1949, Serial No. 125,491

7 Claims. (Cl. 296—102)

This invention relates broadly to tractor cabs and it refers more particularly to detachable cab tops and side curtains affording weather protection to the operator of the tractor and the control instruments within the cab.

It is an object of the invention to provide a tractor cab warmed by the heat of the tractor engine in cold weather for the comfort of the operator, the sides of which cab may be removed in hot weather leaving the roof or top to protect the operator from the sun, rain, etc.

Another object is to provide a structure of the character indicated which is simple and economical to construct, light in weight yet durable and long lived.

A further object of the invention is to provide a tractor cab top of novel construction that is simply assembled and readily adaptable for its different uses.

An important feature resides in the provision of a top made of fabric or like pliable material together with a novel arrangement for making the top taut or slack as desired.

Other features reside in the specific construction and the convenient mounting arrangement for the parts making up my improved tractor cab.

Further objects of the invention, together with the novel structural features by which the objects are achieved, will appear in the course of the following description.

In the accompanying drawings which form a part of the specification and are to be read in conjunction therewith, and in which like reference numerals are employed to identify like parts of the various views, Fig. 1 is a rear perspective view of a tractor having my cab mounted thereon, Fig. 2 is a view of the underside of the roof of the cab, Fig. 3 is an enlarged cross section taken along the line 3—3 of Fig. 2 in the direction of the arrows, Fig. 4 is an enlarged cross section taken along the line 4—4 of Fig. 2 in the direction of the arrows, and Fig. 5 is a fragmentary view illustrating a detail of my assembly.

Referring more particularly to the Fig. 1, the numeral 10 designates a farm tractor of conventional type. The operator rides behind the engine 11 in usual fashion on a seat 12 which is mounted on the tractor chassis or frame between the rear wheels 13; he has within convenient reach the steering wheel 14 as well as the other necessary controls for operating the tractor and its attachments. This general arrangement is, of course, embodied in practically all tractors in current use and it is not my purpose to disclose or be limited to any particular make or kind of tractor, inasmuch as my invention is equally applicable to all tractors of this conventional form.

Around the seat zone is an enclosure of the general type disclosed in United States patent application Serial No. 656,652, filed March 23, 1946, by Michael A. Halligan, now abandoned. This enclosure or cowling, as it will be referred to hereinafter, has a U-shaped frame 15 disposed in a substantially horizontal plane, the bight of the U being forward of the steering wheel and the legs thereof extending rearwardly on either side of the seat to the joint A; they connect to identical rear frames 15a which continue horizontally for a distance, and then are bent downwardly to form supports 15b, the lower extremities of which are secured to the tractor chassis in a manner fully shown in the aforementioned application. The joint A between the frame member 15 and 15a is detailed in Fig. 5, and consists essentially of a bolted connection. The bolt 15c (which extends through aligned holes in the flattened ends of the respective frame members) and its associated wing nut 15d are employed to secure additional frame elements as will be made clearer presently. A central support 16 is provided to carry the weight of the forward end of the bowed frame 15.

A flexible covering of canvas fabric or the like is fastened on the cowling frame just described to form substantially vertical panels 17 on either side of the seat and a front panel 18 joining the side panels forwardly of the steering wheel. The lower edge of the front panel lies snugly against the top of the engine housing and the side panels extend forward to at least partly enclose the engine whereby engine heat is directed rearwardly into the seat enclosure to warm the operator in cold weather. As indicated in the drawings, the flexible covering is attached to the frame members 15, 15a and 15b by doubling its marginal edges over said members and securing them with snap fasteners 19 or the like.

The cowling structure thus far described is not per se my invention; this structure is dealt with more fully in the aforementioned application to which reference may be made for a more comprehensive disclosure of the details mentioned, and it has been outlined here only for the purpose of facilitating an understanding of the improvement about to be explained.

Generally speaking, the salient novelty of my invention resides in the provision of a novel top and sides for the enclosure which otherwise would be left open by the cowling structure, whereby the same is converted into a cab open only at the rear.

Referring now to Fig. 2, the top of my cab comprises a blank of pliable material (preferably waterproofed canvas fabric or the like) of approximately semi-elliptical shape; it has an arcuate forward margin 20a, rearwardly diverging side margins 20b and slightly curved rear margin 20c, these margins being folded over and sewed as shown at 21 to form hems 22. At spaced intervals along the hems are openings 23 which give access to the top framework.

This framework comprises substantially rigid bars or rods preshaped to conform with the outer margin of the top and housed in the seams 22. More specifically it consists of an arcuate forward member 24, two side members 25 with angled ends 25a and a rear member 26. These members all are flattened at their ends, drilled and bolted together to form a frame completely encircling the fabric top. The rear member is upwardly bowed or arched as best seen in Fig. 1, and extending transversely across the top is a similarly arched cross bow 27 having angled ends 27a flattened and bolted to the sides of the frame.

It is impractical and undesirable to form these parts so that when assembled the fabric of the top is taut—impractical because, if so closely dimensioned as to make the fabric taut, this would make the manufacture costly and the assembly difficult; undesirable because it would subject the top to constant stress after assembly, stress which properly should be relieved in periods when the top is removed from the tractor and not in use.

For this reason, the parts preferably are so shaped and dimensioned relative to one another that the outer frame and cross bow 27 may be assembled without making the fabric taut. However, I also provide a pair of ribs 28 and 29 having eyes at their opposite ends to encircle the cross bow and the front and rear frame members as shown. When the top is assembled these ribs occupy the positions shown by dotted lines. When the top is to be put into use, the eyes encircling the cross bow 27 are brought together so that the ribs are in substantial alignment along the longitudinal axis of the top as shown by solid lines; this shift in their position forces the midpoints of the forward and rear frame members slightly away from one another distending the frame longitudinally to such an extent as to bring the fabric to taut condition. Restoring the ribs to dotted position relaxes the tension on the fabric so the top may be stored without the necessity of disassembling it in order to release the tension on the fabric.

The top is mounted on the cowl frame 15 by means of two forward braces 30 and two rear braces 31 all of which have their upper ends angled, flattened and drilled. The manner in which they are attached to the top will best be understood from Fig. 4; there it will be seen that a U-shaped clamp 32 is thrust laterally over the marginal edge of the fabric top, that is, the hem 22 which has the frame member encased therein. The ends of the clamp have aligned holes through which a bolt 33 is threaded piercing the fabric between the ends of the clamp, the upper end of the brace is inserted over the downwardly extending shank of the bolt and fastened with a nut 34 securing the brace tightly to the roof frame. The hole in the fabric formed by the bolt is covered by a flap 35 extending over each side of the top.

The forward braces 30 are provided with eyes at their lower ends and are secured to the cowling frame by identical U-shaped clamps inverted over the upper edge of the cowling with bolts passing horizontally under the cowling frame 15 through holes in the lower ends of the clamp and through said eyes. The lower ends of the rear braces are angled, flattened, drilled and bolted to the cowling frame at the junction A between the front and rear portions thereof (see Figs. 1 and 5).

The space between the cowling and top may be enclosed by a windshield 36 and separate side curtains 37, each of these three units comprising a flexible sheet of transparent material such as isinglass or Celluloid, framed by canvas or like pliable material. Along its upper margin each side curtain is detachably secured to one of the flaps 36 by means of snap fasteners 38, and they may be similarly secured along their lower margins to the side panels 17 of the cowl; I prefer, however, to use such fasteners only at the lower forward corner of each side curtain and secure the rear corner of each by means of a short, coiled spring 39 having its lower end secured to the cowl frame and its upper end hooked into a metal frommet in the side curtain.

The windshield may be similarly secured by snap fasteners at its upper and lower margins. I prefer to support it, however, solely on the cowl frame by means of an auxiliary inverted U-shaped frame 40 disposed in the upper and side marginal hems of the windshield fabric. The two sides of this auxiliary frame slope downwardly to the rear and have at their lower ends eyes by which the windshield frame is secured to the cowling frame at the junction A between the front and rear sections of the latter. With this construction the entire top assembly and the side curtains may be removed from the tractor, leaving the windshield supported on the cowling. Removal of the top is, of course, effected simply by unbolting and disconnecting the braces 30 and 31 at their lower ends from the cowling.

In hot weather the cowling fabric may be removed from its frame, leaving said frame to support my tractor top and thus shelter the operator from the sun. The assembly may under such conditions obviously be employed with or without the windshield and/or side curtains, as the weather dictates.

From the foregoing it will be seen that this invention is one well adapted to attain all of the ends and objects hereinbefore set forth together with other advantages which are obvious and which are inherent to the apparatus.

It will be understood that certain features and subcombinations are of utility and may be employed without reference to other features and subcombinations. This is contemplated by and is within the scope of the claims.

Inasmuch as many possible embodiments of the invention may be made without departing from the scope thereof, it is to be understood that all matter herein set forth or shown in the accompanying drawings is to be interpreted as illustrative and not in a limiting sense.

Having thus described my invention, I claim:

1. In an enclosure for the seat zone of a tractor, a substantially horizontal U-shaped supporting frame mounted on the tractor, posts carried by said frame and extending upwardly therefrom, a substantially horizontal annular frame carried on the upper ends of said posts, a blank of pliable material conforming with the shape of said last frame and secured at its outer margin to said frame, at least one brace spanning said annular frame under said blank to support the same, an auxiliary frame having a horizontally bowed central portion vertically spaced above the bight of said U-shaped frame and disposed directly under said blank of pliable material near the edge thereof, said central portion having on either side thereof a leg inclined downwardly and rearwardly and detachably connected at its lower end to said U-shaped frame whereby said auxiliary frame is supported on said U-shaped frame, and a flexible curved windshield on said auxiliary frame covering the opening between the auxiliary frame and said U-shaped frame.

2. In a roof structure of the character described, an annular frame, a cross piece spanning the frame with its ends secured to opposite sides thereof, a first rib having one end hingedly connected to said frame at a point substantially equidistant between the ends of said cross piece and the other end connected to said cross piece to slide axially thereof, a second rib having one end hingedly connected to said frame at a point opposite said first point and substantially equidistant between the ends of said cross piece, and the other end of said last rib also connected to said cross piece to slide axially of the cross piece.

3. In a roof structure of the kind described, an annular frame, a cross piece spanning the frame with its ends connected to the sides thereof, a blank of pliable material conforming with the shape of the frame and having its marginal edges folded over the frame to form a hem enclosing same, said hem having restricted openings giving access to the frame at two oppositely disposed points each substantially equidistant between the ends of said cross piece, a first rib having at one end an eye loosely encircling the frame at one of said points, means connecting the other end of said rib to said cross piece to slide axially thereof, and a second rib having one end connected to the cross piece substantially at the midpoint thereof, the other end of said second rib connected to said frame at said other point.

4. A roof structure as in claim 3, wherein said connecting means comprises an eye on said other end of said first rib loosely encircling said cross piece.

5. In a structure of the kind described, an annular frame, a cross piece spanning the frame with its ends connected to the sides thereof, a blank of pliable material conforming with the shape of the frame and having its marginal edges folded over the frame to form a hem enclosing same, and said hem having restricted openings giving access to the frame at two oppositely disposed points each substantially equidistant between the ends of the cross piece, a first rib having at one end an eye loosely encircling the frame at one of said points, means connecting the other end of said rib to said cross piece to slide axially thereof, a second rib having at one end an eye loosely encircling said frame at the other of said points, and means connecting the other end of said second rib to said cross piece to slide axially thereof.

6. In a structure of the kind described, an annular frame, a cross piece spanning the frame with its ends connected to the sides thereof, a blank of pliable material conforming with the shape of the frame and having its marginal edges folded over the frame to form a hem enclosing same, said hem having restricted openings giving access to the frame at two oppositely disposed points each substantially equidistant between the ends of said cross piece, a first rib having at one end an eye loosely encircling the frame at one of said points, a second rib having at one end an eye loosely encircling said frame at the other said points, each rib having at its opposite end an eye loosely encircling said cross piece.

7. In a roof structure of the character described, a pair of separable oppositely disposed U-shaped frame members, the ends of the legs of one of said members registering respectively with the ends of the legs of the other member whereby the two members together form a continuous annulus, the whole of one of said frame members and the legs of the other frame member being disposed in the same horizontal plane, the bight of said other U-shaped frame member being upwardly arched relative to said plane, a brace bridging said annulus with its opposite ends registering respectively with the ends of the legs of each of said frame members, said brace being arched upwardly relative to said plane, a single means at each end of said brace detachably connecting the end of the brace and the registering ends of both frame members to form a rigid joint between the brace and both frame members, a pair of ribs extending in opposite directions from the mid-point of said brace, one of said ribs connected to the mid-point of the bight of one frame member and the other of said ribs connected to the mid-point of the bight of the other frame member, and a blank of pliable material supported on said brace and ribs, said blank conforming in shape with said annulus and having its margin secured to said frame members.

WALTER L. WEAKLEND.

REFERENCES CITED

The following references are of record in the file of this patent:

UNITED STATES PATENTS

| Number | Name | Date |
|---|---|---|
| 639,890 | Delaney | Dec. 26, 1899 |
| 723,749 | Sprague | Mar. 24, 1903 |
| 1,067,660 | Kay | July 15, 1913 |
| 1,275,664 | Davis | Aug. 13, 1918 |
| 1,418,181 | Sunde | May 30, 1922 |
| 2,000,205 | Wickstrum | May 7, 1935 |
| 2,256,890 | Brown et al. | Sept. 23, 1941 |
| 2,430,442 | Acheson | Nov. 11, 1947 |
| 2,486,734 | Campbell | Nov. 1, 1949 |